United States Patent [19]

Higdon

[11] Patent Number: 5,419,104

[45] Date of Patent: May 30, 1995

[54] MOUNTING FRAME FOR MOWER ATTACHMENT

[76] Inventor: Daniel R. Higdon, Box 152, Vinton, Iowa 52349

[21] Appl. No.: 137,982

[22] Filed: Oct. 19, 1993

[51] Int. Cl.⁶ .......................................... A01D 34/86
[52] U.S. Cl. ..................................... 56/10.1; 56/14.7; 56/15.2
[58] Field of Search ...................... 56/10.4, 14.8, 14.7, 56/14.9, 15.1, 15.2, 15.3, 15.5, 16.2, 237, 235, 268, 295, 10.1

[56] References Cited

U.S. PATENT DOCUMENTS

| | | |
|---|---|---|
| 2,165,851 | 7/1939 | Harman . |
| 3,045,413 | 7/1962 | Sheffer . |
| 4,206,580 | 6/1980 | Truax et al. . |
| 4,502,269 | 3/1985 | Cartner . |
| 4,901,508 | 2/1990 | Whatley . |
| 5,146,733 | 9/1992 | Klaeger . |

*Primary Examiner*—Ramon S. Britts
*Assistant Examiner*—Pamela O'Connor
*Attorney, Agent, or Firm*—James C. Nemmers

[57] ABSTRACT

A supporting frame for a mower attachment of the rotary or flail type to provide for quick attachment of the mower to and detachment of the mower from a road grader or similar prime mover. The mower is designed for mowing roadside ditches, and the supporting frame mounts the mower so it can float and still be easily raised and lowered by the operator when necessary for transport.

4 Claims, 3 Drawing Sheets

MOUNTING FRAME FOR MOWER ATTACHMENT

BACKGROUND OF THE INVENTION

Road graders and similar machines are commonly used to maintain public roads. These machines have blades that can be mounted for grading and smoothing the traveled surface of unpaved roads as well as the adjacent ditches and banks. These machines are also used for snow removal. The crews of the governmental units that maintain public roads also have to mow the weeds and other growth along the road especially in the medians and ditches. In order to do this, separate mowing equipment is normally used. This equipment may be specially designed equipment for mowing, or may be mowers that are attached by boom assemblies to tractors or other prime movers. For example, Jordan, et al., U.S. Pat. No. 3,319,407 discloses the use of a combination of cables and hydraulic cylinders for supporting a mower attachment on a prime mover. This attachment is a rather complex piece of equipment requiring a number of hydraulic cylinders mounted along a boom assembly.

Turner, U.S. Pat. No. 4,873,818, Davison, U.S. Pat. No. 4,996,830 and Johnson, U.S. Pat. No. 4,426,829 all show boom mounted mowers and brush cutters designed for mowing ditches and adjoining banks along a roadway. These boom-type attachments are relatively complex and expensive, and are not easily attached and detached from their prime movers.

Lynch, U.S. Pat. No. 4,869,056 and Parsons, Jr., U.S. Pat. Nos. 4,887,417, 4,912,916 and 4,956,965 all show a boom attachment for mounting a mower at the rear of a tractor by a three-point hitch, with the attachment operated from a power takeoff on the rear of the tractor. Similar to the other boom-type attachments for prime movers, these attachments are rather complex and expensive and require a considerable amount of time to mount and dismount from a tractor.

Hash, U.S. Pat. No. 4,250,696 discloses a mower-type attachment for a road grader, but the attachment is mounted so that it would not be suitable for mowing roadside ditches.

None of the prior art references disclose a simple and relatively inexpensive attachment for quick and easy mounting and dismounting to the common road grader, which road maintenance crews have normally sitting idle much of the time during the spring, summer and fall months.

Accordingly, a need exists for an improved mower attachment that can be quickly attached to and detached from a road grader or other similar machine and which is suitable for mowing roadside ditches. Such an attachment would provide for better utilization of existing equipment that normally is sitting idle during the months when the mowing of roadside ditches commonly takes place.

SUMMARY OF THE INVENTION

The invention is for a mounting frame that can be quickly and easily attached to a prime mover such as a road grader to provide a roadside mowing capability, especially for ditches. The frame is designed to support a rotary or flail-type mower on a subframe that floats because of a unique cable arrangement that also permits the operator to raise and lower the subframe and thus the mower into and along a roadside ditch. The floating feature provided by the subframe will allow the operator to easily guide the mower along the contour of the ditch. Because of the design of the main supporting frame, the grader can be driven up to and engage the main frame, and after attaching the hydraulic connections with quick couplers, a pair of pins are inserted and the mower is ready for transport and operation.

DESCRIPTION OF THE PREFERRED EMBODIMENT OF THE INVENTION

Figure 1:
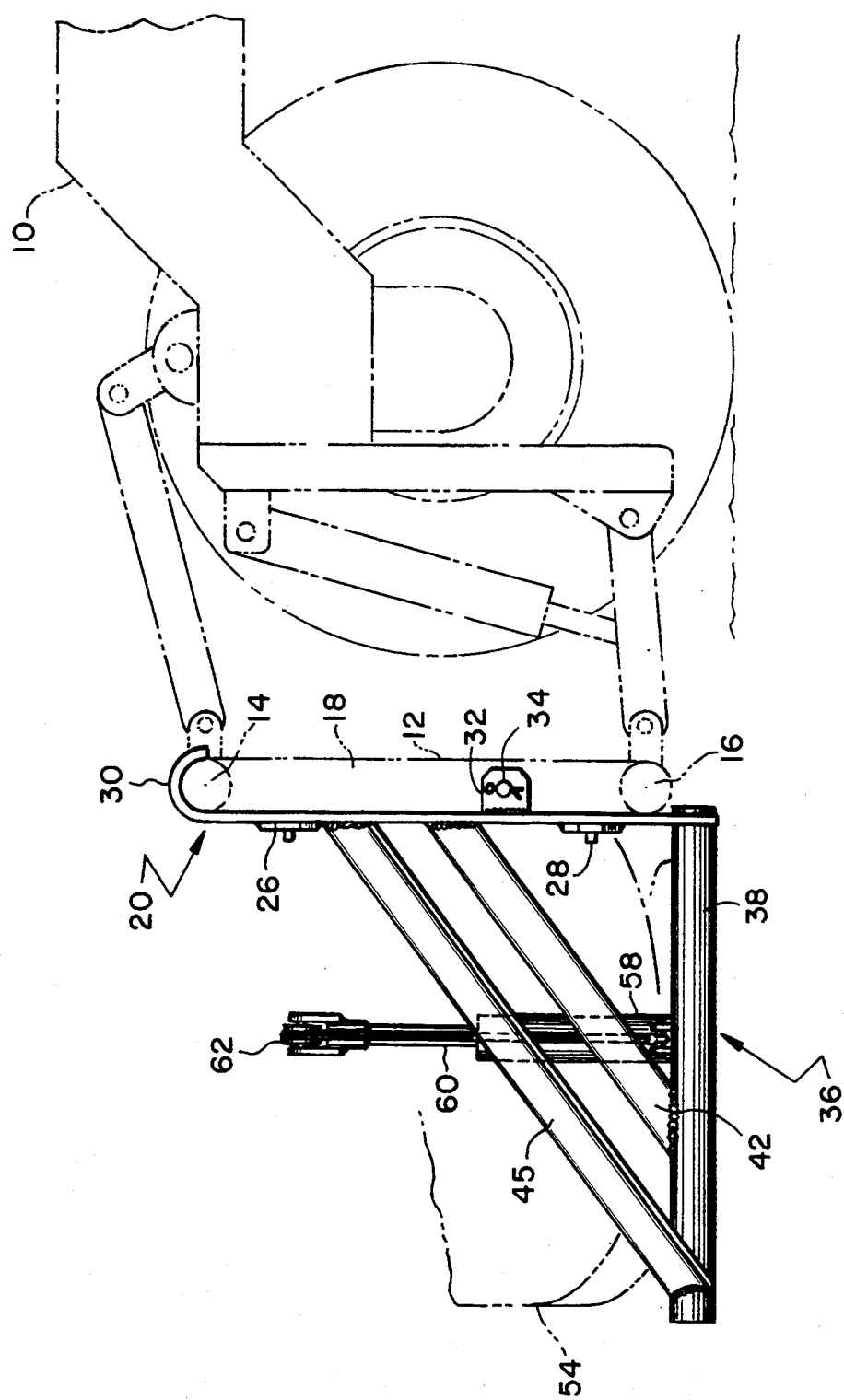
FIG. 1 is a side elevational view of a portion of a typical road grader and showing the mounting frame of the invention in position on the front of the grader.
Figure 2:
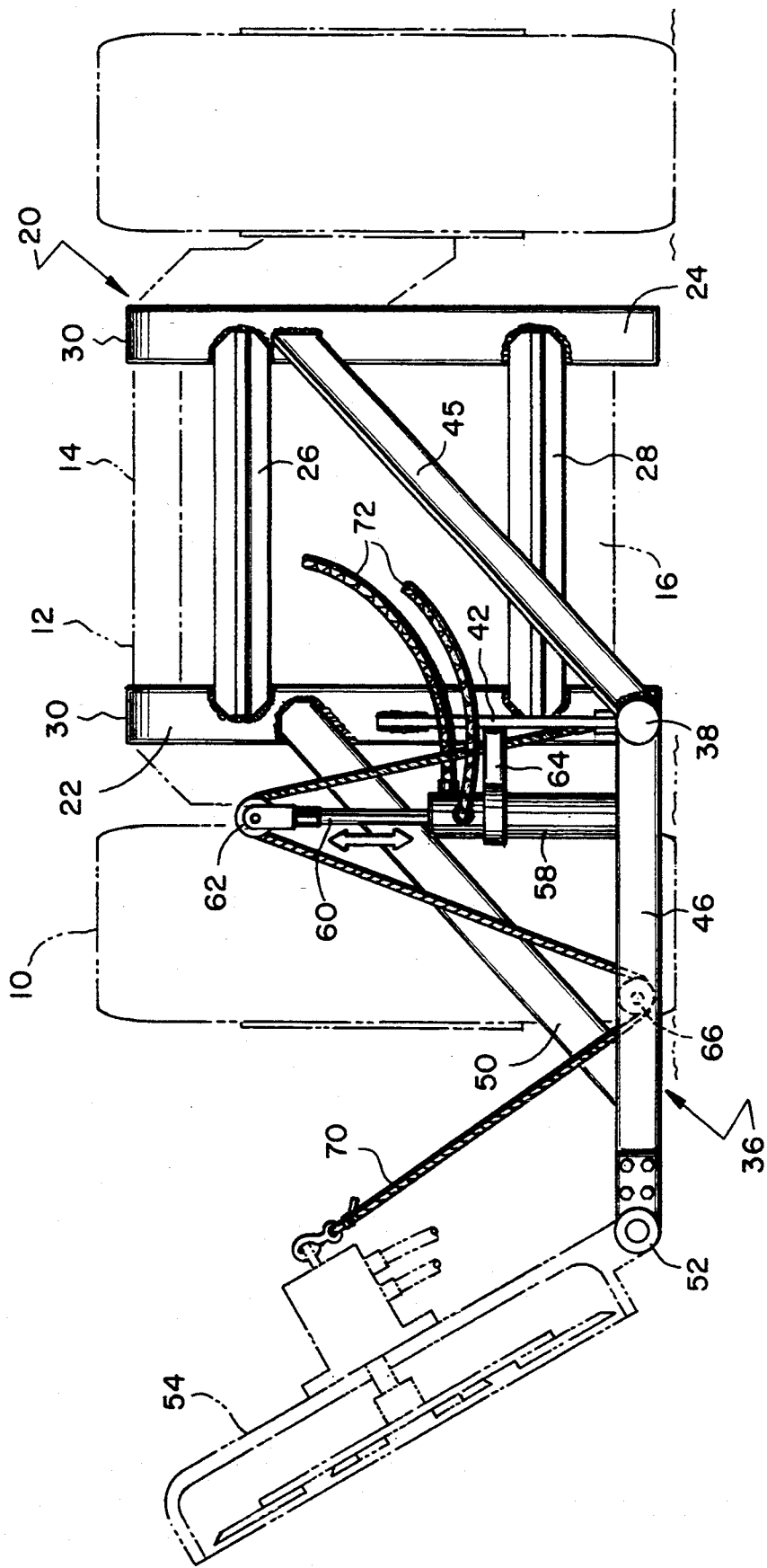
FIG. 2 is a front elevational view of the mounting frame of the invention detached from the road grader for purposes of clarify.
Figure 3:
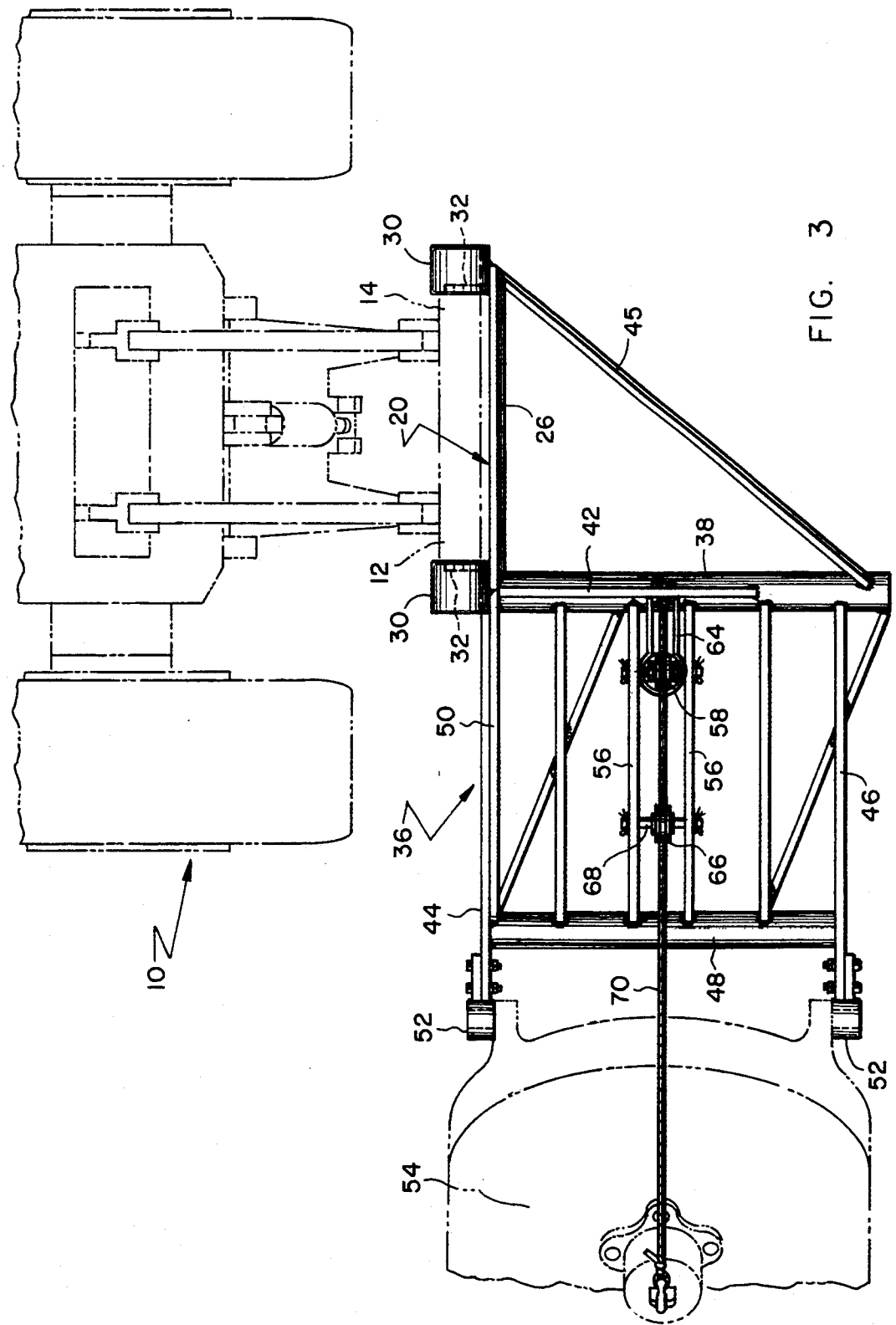
FIG. 3 is a top elevational view of the mounting frame of the invention detached from the road grader and illustrating a flail-type mower attached to the subframe.

Referring now to FIG. 1, there is illustrated in phantom a portion of a road grader 10 or other similar machine which has a parallelogram arrangement 12 that includes a pair of horizontal members 14 and 16 attached to a pair of vertical supports 18, the horizontal members 14, 16 and vertical supports 18 forming a rectangular frame that can be raised and lowered in a substantially vertical plane by the hydraulic system (not shown) of the road grader 10, as is well known to those skilled in the art. The parallelogram arrangement 12 forms no part of the invention, and it should be understood that the particular structure of the main frame of the invention that is described hereinafter will vary depending upon the type and model of the road grader or other prime mover with which the attachment is used.

In the preferred embodiment that is shown herein which is designed for use with a conventional road grader, the main mounting frame, indicated generally by the reference numeral 20, has a pair of vertical upright frame members 22 and 24 that are parallel to each other and spaced apart and separated by two horizontal supports 26 and 28. At the upper end of each of the vertical upright frame members 22 and 24 is a curved hook portion 30 that is designed to fit over the horizontal member 14 of the road grader 10. Near the lower end of each of the vertical upright frame members 22 and 24 are a pair of connectors 32 each of which has an opening extending horizontally through it to receive a connecting pin 34. This basic main frame 20 therefore provides a means of quick connect and disconnect from the road grader 10. To make the connection, the grader 10 is moved into position until the horizontal member 14 of the grader 10 is beneath the hook portions 30. The parallelogram arrangement 12 is then raised slightly until the connectors 32 are properly aligned with corresponding openings (not shown) in the vertical supports 18 of the parallelogram arrangement 12 at which time the connecting pins 34 can be inserted to positively lock the mower mounting frame to the road grader 10.

The mower mounting frame of the invention also includes a subframe indicated generally by the reference numeral 36. The subframe has a first horizontal support 38 welded or otherwise suitably affixed to the lower end of the vertical upright 22 of the main frame 20. Cross support 42 connected to the vertical upright 22 and cross support 45 connected to the vertical upright 24 provide additional rigidity to the subframe 36. The main horizontal support 38 of the subframe 36 has two outwardly extending members 44 and 46, one at each end of the main horizontal support 38. The outwardly extending members 44 and 46 are spaced apart and parallel and are rigidly connected at their outer ends by member 48. To provide additional rigidity, a cross support member 50 is affixed to the vertical upright frame member 22 of the main frame 20 and to the outwardly extending member 44.

At the outer ends of the outwardly extending members 44 and 46 are connectors 52 that provide for pivotal and removable connection of the mower unit, which is indicated generally by the reference number 54. The mower unit 54 can be of any suitable type such as the rotary-type or the flail-type. The connectors 52 provide for pivotal connection of the mower unit 54 to the subframe 36.

Extending between the main horizontal support 38 of the subframe 36 and the member 48 are a pair of parallel extending intermediate supports 56. These intermediate supports 56 provide for the mounting of a hydraulic cylinder 58 that is oriented in a vertical position and has its operating rod 60 connected to a pulley 62. Supplemental support arm 64 provides additional support for the hydraulic cylinder 58. A second pulley 66 is pivotally mounted on axle 68 which extends between the intermediate supports 56. A cable 70 has one end affixed to the main horizontal support 38 of the subframe and extends over the pulley 62 that is affixed to the operating rod 60 of the hydraulic cylinder 58. Cable 70 then passes beneath the second pulley 66 and upwardly for connection to the lift point on the mower unit 54. Thus, when the hydraulic cylinder 58 is operated, the cable 70 will be withdrawn or extended thus permitting the mower unit 54 to be raised or lowered to fit the contour of the ditch and also for transport purposes. The cable arrangement however, allows the mower unit 54 to float by reason or its pivotal connection to the connectors 52 of the subframe 36.

The hydraulic cylinder 58 is connected by suitable hydraulic hoses 72 by the use of common quick couplers (not shown), and the oil supply to run the mower unit 54 is hooked by supply and return lines (not shown) to the valve bank (not shown) on the road grader 10.

It will evident from the foregoing description that the invention provides a very simple rugged and relatively inexpensive mounting frame attachment for a mower that is capable of mowing roadside ditches. Because of its simplicity, it is easily attached to and disconnected from the road grader by use of a pair of connecting pins and quick couplings for the hydraulic connections. By use of a hydraulic cylinder controlling a cable that is attached to the mower unit, the mower can be raised and lowered by the operator for transport, for raising the mower over driveway entrances, etc. When the mower unit is properly positioned by the operator, it will float along the contour of the ground by reason of the pivotal connection to the subframe, with the cable flexing to allow the mower to properly float. It will be evident to those skilled in the art that the specific design details of the mower attachment frame of the invention will be varied depending upon the specific type or model of road grader for which the attachment is designed. It will be further evident that specific design and structural details to the main frame and subframe can be made without affecting the basic design and operation of the attachment frame of the invention.

Having thus described the invention in connection with the preferred embodiment thereof, it will be evident to those skilled in the art that various other revisions and modifications can be made to the preferred embodiment disclosed herein without departing from the spirit and scope of the invention. It is my intention, however, that all such revisions and modifications that are obvious to those skilled in the art will be included within the scope of the following claims:

What is claimed is as follows:

1. A mounting frame assembly for removably connecting to a prime mover a mower for mowing ditches and the like along a road, the prime mover having attachment means that can be raised and lowered by an operator to raise and lower the mower, said mounting frame assembly comprising: a main frame having upper and lower portions and means for removably connecting the main frame to the attachment means of the prime mover; a subframe rigidly connected to the main frame and extending outwardly from the lower portion of the main frame away from the prime mover and in a direction toward a ditch along the road as the prime mover moves along the road; said subframe having an inner end and an outer end, the inner end being rigidly connected to the main frame; connection means on the outer end of the subframe providing for pivotal movement of the mower about an axis that if generally horizontal; a fluid cylinder mounted on the subframe and having an operating rod; and a cable operatively connected to the operating rod of said cylinder and having one end connected to the mower so that the mower can be raised and lowered about said axis by action of the cylinder while allowing the mower to freely pivot upwardly without action of the cylinder.

2. The mounting frame assembly of claim 1 in which a first pulley is operatively connected to the operating rod of the fluid cylinder, and the cable is fixed at an end to the frame assembly with its other end connected to the mower after passing over the first pulley.

3. The mounting frame assembly of claim 2 in which the fluid cylinder and its operating rod extend generally vertically and the first pulley is connected to the outer end of the operating rod, a second pulley is mounted on the subframe at a point below the first pulley, and the cable passes around the second pulley after passing over the first pulley but before being connected to the mower.

4. The mounting frame assembly of claim 3 in which the means for removable connection of the main frame to the attachment means of the prime mover includes a removable pin connection that provides for quick connect and disconnect of the mounting frame assembly to the prime mover.

* * * * *